(12) United States Patent  
Suh

(10) Patent No.: US 9,127,941 B2  
(45) Date of Patent: Sep. 8, 2015

(54) SYSTEM FOR MEASURING VEHICLE DISTANCE AND METHOD THEREOF

(71) Applicant: MANDO CORPORATION, Pyeongtaek-si (KR)

(72) Inventor: Seuk Gyo Suh, Seongnam-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 0 days.

(21) Appl. No.: 14/307,226

(22) Filed: Jun. 17, 2014

(65) Prior Publication Data  
US 2015/0185003 A1 Jul. 2, 2015

(30) Foreign Application Priority Data  
Dec. 27, 2013 (KR) .................. 10-2013-0164838

(51) Int. Cl.  
G01C 3/02 (2006.01)

(52) U.S. Cl.  
CPC ........................ G01C 3/02 (2013.01)

(58) Field of Classification Search  
CPC ....... G06G 7/78; G08G 1/0112; G08G 1/168; G08G 1/16; G08G 1/164; B60Q 1/525; B62D 1/00; B60R 1/00; G06K 2209/15; G06K 2209/23; G01C 3/02  
See application file for complete search history.

(56) References Cited

U.S. PATENT DOCUMENTS

| 4,948,246 | A | 8/1990 | Shigematsu | |
|---|---|---|---|---|
| 2006/0232442 | A1* | 10/2006 | Vastad et al. | 340/932.2 |
| 2007/0047809 | A1 | 3/2007 | Sasaki | |
| 2007/0067089 | A1* | 3/2007 | Yoshida | 701/96 |
| 2008/0100428 | A1* | 5/2008 | Price | 340/435 |
| 2009/0251335 | A1* | 10/2009 | Moon | 340/933 |
| 2009/0323046 | A1* | 12/2009 | Tan et al. | 356/4.01 |
| 2013/0187771 | A1* | 7/2013 | Rothschild | 340/435 |
| 2013/0226432 | A1* | 8/2013 | Tsuruta et al. | 701/96 |
| 2013/0229523 | A1* | 9/2013 | Higgins-Luthman et al. | 348/148 |

FOREIGN PATENT DOCUMENTS

| DE | 11 2009 005 352 | 8/2012 |
|---|---|---|
| GB | 1 261 232 | 1/1972 |
| WO | 2012/0159109 | 11/2012 |

OTHER PUBLICATIONS

Office Action dated Jan. 26, 2015 for German Patent Application No. 10 2014 009 097.3 and its English summary provided by Applicant's foreign counsel.

* cited by examiner

Primary Examiner — Rodney Butler  
(74) Attorney, Agent, or Firm — Ladas & Parry, LLP

(57) ABSTRACT

The present invention relates to a vehicle distance measurement system and method in which a distance to a leading vehicle is measured using predetermined tread information of a tire of the vehicle in order to measure an accurate distance to the leading vehicle even when a vehicle runs at night.

10 Claims, 9 Drawing Sheets

Fig. 6b
| Class | 1 | 2 | 3 |
|---|---|---|---|
| Texture | 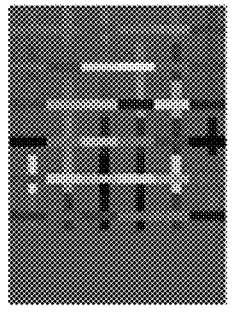 | 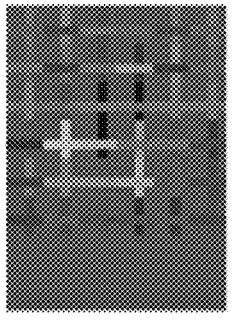 | 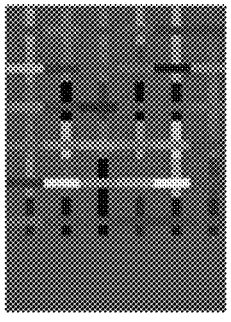 |
| Recognition rate | 95% | 85% | 80% |

SYSTEM FOR MEASURING VEHICLE DISTANCE AND METHOD THEREOF

CROSS-REFERENCE TO RELATED APPLICATIONS

This application claims priority to Korean Patent Application No. 10-2013-0164838 filed on Dec. 27, 2013, the disclosure of which is hereby incorporated by reference in its entirety.

BACKGROUND

1. Field of the Invention

The present invention relates to a vehicle distance measurement system and method in which an accurate distance to a leading vehicle is measured even when a vehicle runs at night.

2. Discussion of Related Art

Systems that are able to recognize a vehicle in the front or back of a driver's own vehicle and implement various functions have been recently mounted on the own vehicle. Such systems provide an image of a front or back vehicle on a display screen to the vehicle driver directly or provide specific information inserted through a specific step to the vehicle driver.

For example, among such systems, a collision prevention system for safety of vehicle drivers detects vehicles around the own vehicle using a radar that senses the vehicles and a camera that outputs an image of the vehicles, so that collision between the own vehicle and the front or back vehicle can be prevented.

Recently, there is an increasing need for a vehicle recognition method that is able to perform recognition of vehicles only with an image output from a camera without assistance of a peripheral device such as a radar for a simple structure and a low production cost of the system.

Accordingly, there is a method of measuring a distance to a leading vehicle by recognizing a tire tread of the leading vehicle using a camera and a sensor, but it is difficult to measure an accurate distance to the leading vehicle by recognizing the tread of the vehicle using the camera and the sensor due to a dark illumination at night.

SUMMARY OF THE INVENTION

Therefore, the present invention has been made to solve the problems of conventional technology as described above, and an object of the present invention is to provide a vehicle distance measurement system and method capable of measuring an accurate distance to a leading vehicle even when a vehicle runs at night.

Further, another purpose of the present invention is to provide a vehicle distance measurement system and method capable of measuring a distance to a leading vehicle more accurately in further consideration of a vehicle model of the leading vehicle.

A vehicle distance measurement system according to an embodiment of the present invention for achieving the above object includes an image reception unit that receives an image of surroundings including an image of a specific vehicle; a database unit that stores light source information indicating positions of vehicle taillights corresponding to a first light source and a second light source, and vehicle model data corresponding to the light source information; a control unit that extracts the first light source of the specific vehicle and the second light source matching the first light source from the image received through the image reception unit, extracts the light source information corresponding to the first light source and the second light source from the database, and extracts the vehicle model data corresponding to the extracted light source information to recognize a type of the specific vehicle; and a distance measurement unit that measures a distance to the specific vehicle based on the type of the specific vehicle recognized through the control unit.

Further, a vehicle distance measurement method according to an embodiment of the present invention for achieving the above object includes receiving an image of surroundings including an image of a specific vehicle; extracting a first light source and a second light source matching the first light source from the received image; extracting light source information indicating positions of vehicle taillights corresponding to the first and second extracted light sources; extracting vehicle model data corresponding to the extracted light source information to recognize a type of the specific vehicle; and measuring a distance to the specific vehicle based on the recognized type of the specific vehicle.

Effects of the Invention

As described above, with the vehicle distance measurement system and method according to the present invention, it is possible to accurately measure a distance to a leading vehicle by measuring the distance to the leading vehicle using predetermined data even when a vehicle runs at night.

Further, with the vehicle distance measurement system and method according to the present invention, it is possible to obtain more accurate data by measuring the distance to the leading vehicle using data discriminated among vehicle models.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 6a and 6b are diagrams illustrating a method of identifying a vehicle model using taillights according to an embodiment of the present invention.

DETAILED DESCRIPTION OF EXEMPLARY EMBODIMENTS

Figure 1:
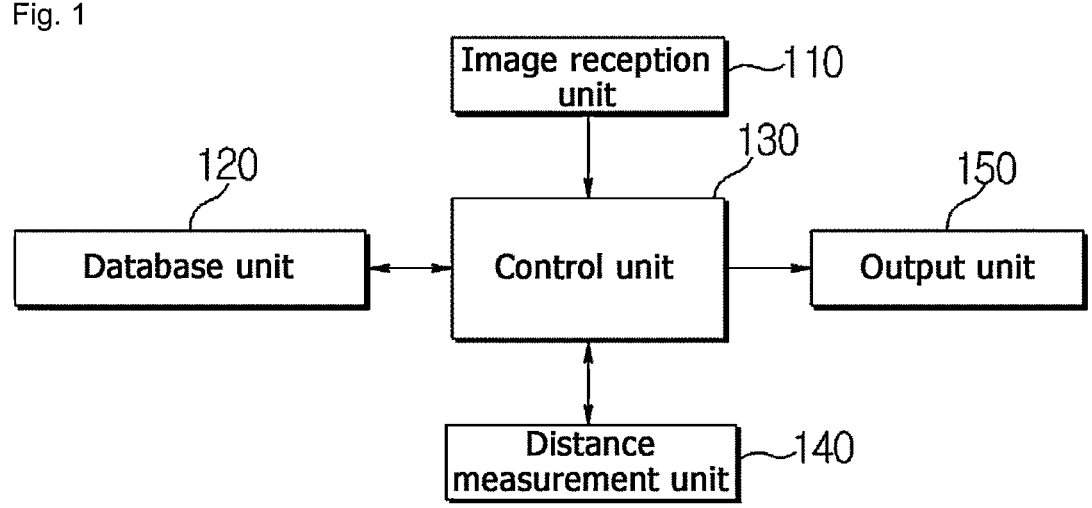
FIG. 1 is a diagram illustrating a schematic configuration of a vehicle distance measurement system according to an embodiment of the present invention.

Hereinafter, embodiments disclosed in this disclosure will be described in detail with reference to the accompanying drawings. The same or similar components are denoted with the same reference numerals regardless of the reference numerals, and a repeated description thereof is omitted. A "device" and a "unit" for components in the following description are used for only ease of explanation and have no distinct meaning or role.

Further, a concrete description for known related technology is omitted when such a description is determined to make the gist of the embodiments disclosed in this disclosure ambiguous in explaining the embodiments disclosed in this disclosure. Further, it is understood that the accompanying drawings are intended to assist in understanding the embodiments disclosed in this disclosure, and that technical matters disclosed in this disclosure should not be construed to be limited by the accompanying drawings.

Figure 2:
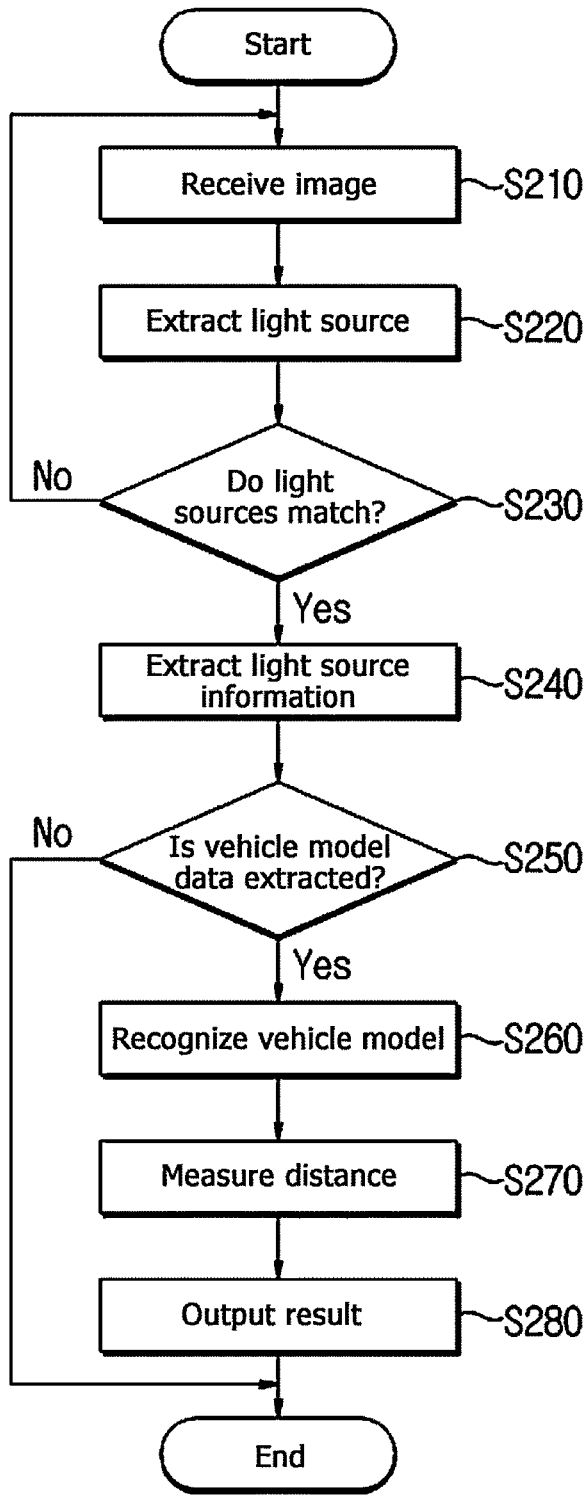
FIG. 2 is a flowchart illustrating a schematic flow of a vehicle distance measurement method according to an embodiment of the present invention.

FIG. 1 is a diagram illustrating a schematic configuration of a vehicle distance measurement system according to an embodiment of the present invention, and FIG. 2 is a flowchart illustrating a schematic flow of a vehicle distance measurement method according to an embodiment of the present invention.

Hereinafter, a vehicle distance measurement method illustrated in FIG. 2 will be described with reference to the configuration of the vehicle distance measurement system illustrated in FIG. 1.

The vehicle distance measurement system according to an embodiment of the present invention may include an image reception unit 110, a database unit 120, a control unit 130, a distance measurement unit 140, and an output unit 150, as illustrated in FIG. 1. Meanwhile, the components illustrated in FIG. 1 do not have fixed names and the system may be implemented to include more components or less components.

First, an image of surroundings, including an image of a specific vehicle, may be received by the image reception unit 110 [S210]. The image reception unit 110 receives an image of surroundings of its own vehicle input from the outside, and may include a camera installed in the front, back or side of the vehicle.

Then, the control unit 130 may extract a light source from the received image of surroundings [S220]. In other words, the control unit 130 may analyze the image of surroundings received through the image reception unit 110 to extract a first light source. The first light source may include a taillight of the specific vehicle, and the control unit 130 may analyze the received image of surroundings, extract a place having suddenly increasing luminance in the image of surroundings, and define the place as the first light source.

Also, the control unit 130 may extract a light source matching the extracted light source, and extract light source information corresponding to the extracted light source [S230 and S240].

The light source may include a pair of light sources, and the control unit 130 may perform pairing on the first extracted light source to extract the second light source. The pairing refers to determining associated light sources to be one light source in consideration of a position, brightness, a size, a color or the like of the light sources, and may be used to determine taillights of the vehicle. In other words, the control unit 130 may extract a light source having the same luminance as the first light source, and define such an a light source as the second light source, or may extract the second light source based on a distance to the first light source. The control unit 130 may then extract light source information corresponding to the first light source and the second light source. The light source information may include information indicating positions of the taillights of the vehicle according to a type of vehicle, including a car, a bus, a truck and the like.

Then, the control unit 130 may extract vehicle model data corresponding to the extracted light source information, and recognize a vehicle model of the specific vehicle [S250 and S260]. In other words, the control unit 130 may extract the vehicle model data of a vehicle model corresponding to a type of vehicle, such as a car, a bus and a truck classified based on the extracted light source information. The vehicle model data may include tread information indicating a position in which a tire of the specific vehicle comes in contact with a road surface. The tread information may include information predetermined by a pattern classifier, which classifies a type of vehicle based on a pattern of a tire tread of the vehicle.

The distance measurement unit 140 may measure a distance to the specific vehicle based on the recognized vehicle model from the control unit, and output a result through the output unit 150 [S270]. The distance measurement unit 140 may extract a position of the specific vehicle based on the tread information and measure the distance to the specific vehicle based on the extracted position of the specific vehicle. In this case, the distance measurement unit 140 may measure the distance to the specific vehicle using the position of the specific vehicle and positions of vanishing points of the first light source and the second light source. Also, the output unit 150 may output the measured position of the specific vehicle on a display screen in real time.

In this case, when the measured distance to the specific vehicle is equal to or less than a predetermined threshold, a warning message may be output through the output unit 150. The warning message may be output through the screen or a speaker.

As described above, the vehicle distance measurement device according to an embodiment of the present invention has an advantage in that it is possible to accurately measure the distance to the leading vehicle by measuring the distance to the leading vehicle with reference to the predetermined data even when an image of the leading vehicle is not captured well through the camera while a vehicle is running at night.

Figure 3:
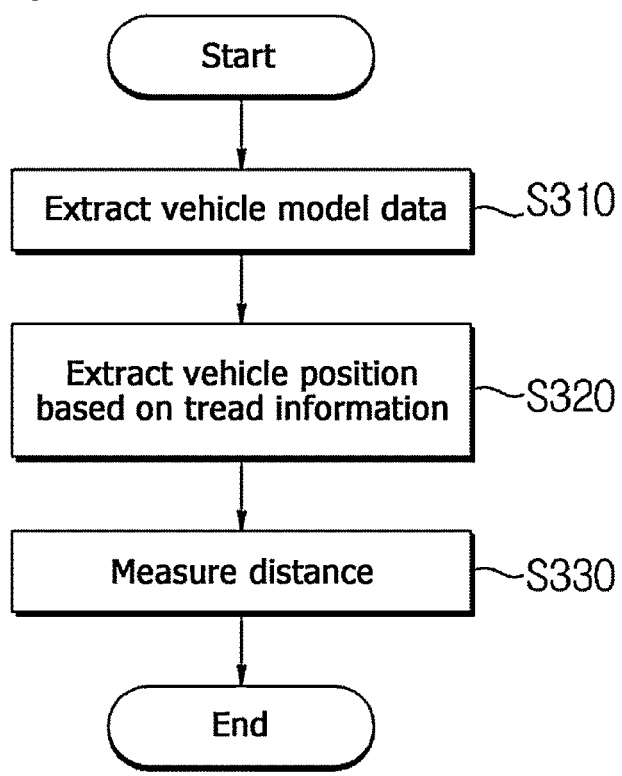
FIG. 3 is a flowchart schematically illustrating a method of measuring a distance to a leading vehicle using vehicle model data according to an embodiment of the present invention.

FIG. 3 is a flowchart schematically illustrating a method of measuring a distance to a leading vehicle using vehicle model data according to an embodiment of the present invention.

In the method of measuring a distance to a leading vehicle using vehicle model data according to an embodiment of the present invention, when the vehicle model data is extracted from a database, a position of the leading vehicle may be extracted based on tread information included in the vehicle model data, as illustrated in FIG. 3 [S310 and S320]. In other words, the first light source and the second light source may be extracted to recognize positions of the taillights of the leading vehicle, and the vehicle model of the leading vehicle may be recognized based on the recognized positions of the taillights, as described above. An accurate position of the leading vehicle may be determined using the tread information corresponding to the vehicle model of the leading vehicle. In general, the position of the leading vehicle may be determined using a camera or a speed sensor mounted on the own car, and when a vehicle runs at night, accurate information may not be obtained using the camera. Accordingly, for example, light source information indicating positions of taillights according to a vehicle model and vehicle model data indicating tread information according to the vehicle model may be predetermined, stored in a database, and extracted and used when measurement of the distance to the leading vehicle is necessary.

The distance to the leading vehicle may be then measured [S330]. A distance between the leading vehicle and the own vehicle may be measured with reference to data of a speed sensor, an acceleration sensor, and the like mounted on the own vehicle based on the position of the leading vehicle determined using the tread information of the leading vehicle.

Figure 4:
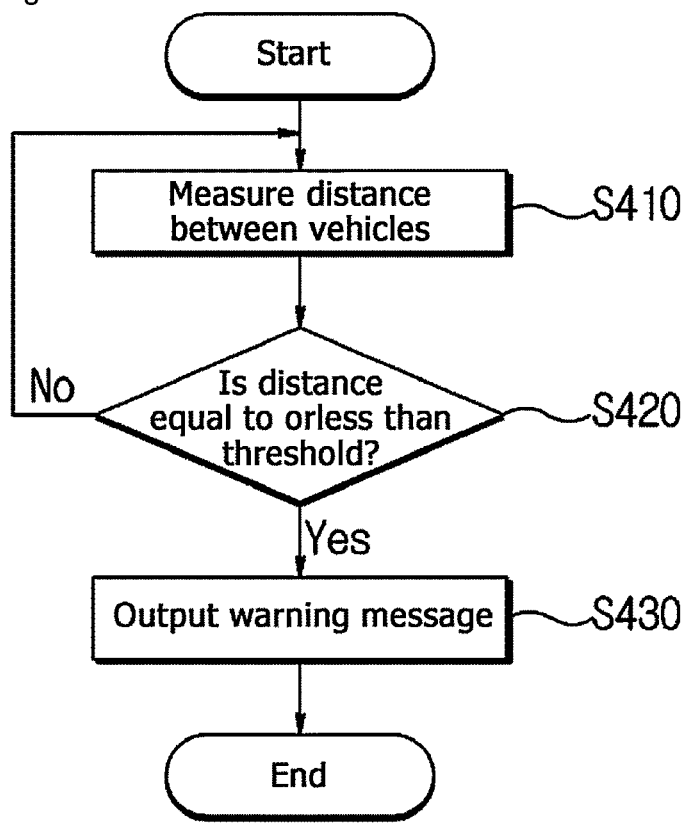
FIG. 4 is a flowchart schematically illustrating a method of warning a vehicle driver when a distance to a leading vehicle is short according to an embodiment of the present invention.

FIG. 4 is a flowchart schematically illustrating a method of warning a vehicle driver when a distance to a leading vehicle is short according to an embodiment of the present invention.

As illustrated in FIG. 4, the distance between the own vehicle and the leading vehicle may first be measured, as described above. [S410]. In other words, the first light source and the second light source may be extracted to recognize the positions of the taillights of the leading vehicle, and the vehicle model of the leading vehicle may be recognized based on the recognized positions of the taillights, as described above. Also, the accurate position of the leading vehicle may be determined using tread information corresponding to the vehicle model of the leading vehicle. The distance between the leading vehicle and the own vehicle may be measured with reference to, for example, the data of the speed sensor and the acceleration sensor mounted on the own vehicle based on the position of the leading vehicle determined using the tread information of the leading vehicle.

In this case, when the measured distance between the own vehicle and the leading vehicle is equal to or less than a threshold, a warning message may be output [S420 and S430]. The warning message may be output as sound through the speaker or may be displayed as a warning wording on the display screen.

As described above, the vehicle distance measurement system according to an embodiment of the present invention has an advantage in that: when the distance to the leading vehicle is equal to or less than the threshold, a warning wording is displayed on a navigation screen or a warning is output through the speaker, so that the vehicle driver can carefully drive with awareness even when the vehicle driver drives at night.

Figure 5A:
FIGS. 5a and 5b are diagrams illustrating a method of extracting light sources of a leading vehicle according to an embodiment of the present invention.
Figure 5B:

FIGS. 5a and 5b are diagrams illustrating a method of extracting the light sources of the leading vehicle according to an embodiment of the present invention.

FIG. 5a is a diagram illustrating a method of extracting a first light source according to an embodiment of the present invention.

An image of surroundings received through a camera may be analyzed to extract a first light source, as illustrated in FIG. 5a. The first light source may include a taillight of a specific vehicle and may be pared with the other light source. The first light source may be defined as a place having suddenly increasing luminance in the image of surroundings through analysis of the image of surroundings.

FIG. 5b is a diagram illustrating a method of extracting a second light source matching the first light source according to an embodiment of the present invention.

The second light source matching the first extracted light source may be extracted, as illustrated in FIG. 5b. The light source may include a pair of light sources, and the first light source extracted earlier may be paired to extract the second light source. The pairing described above, judging relevant light sources as one, may judge the taillight of the vehicle in consideration of a position, brightness, a size, a color or the like of the light sources. In other words, is extracted a light source with luminance same as the first light source, and the second light source may define it and may extract the second light source based on the distance with the first light source.

Figure 6A:
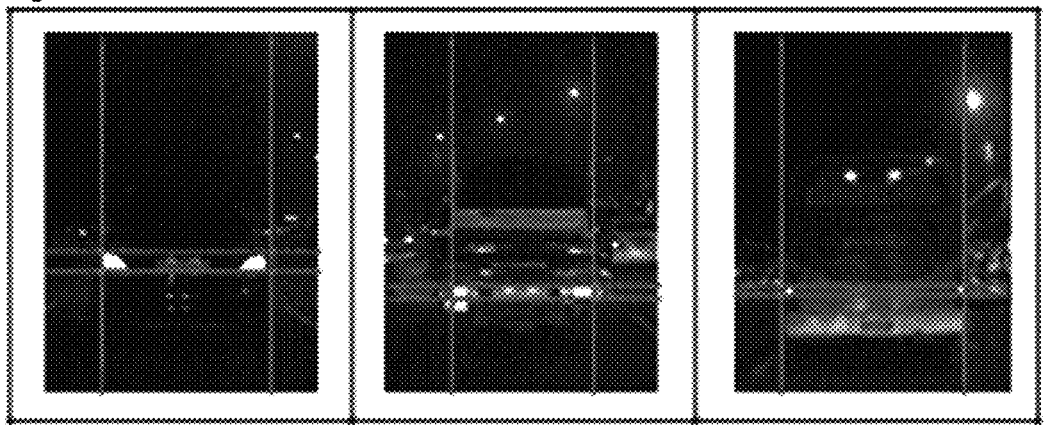

FIGS. 6a and 6b are diagrams illustrating a method of identifying a vehicle model using taillight according to an embodiment of the present invention.

FIG. 6a is a diagram illustrating a screen on which positions of taillights for each vehicle model are paired into data according to an embodiment of the present invention.

Information of taillights differently located according to vehicle models as illustrated in FIG. 6a may be complied and stored in a database. The taillight information may be stored in a form in which the first light source and the second light source are paired, and associated light sources may be determined as a pair in consideration of a position, brightness, a size, a color or the like of the light sources. In other words, a light source having the same luminance as the first light source may be extracted and defined as a second light source, or the second light source may be extracted based on the distance to the first light source.

FIG. 6b is a diagram illustrating a method of analyzing taillights through image processing to identify the vehicle model.

An image of FIG. 6a is subjected to image processing shown in FIG. 6b to identify the type of vehicle. The type of vehicle may be classified into, for example, a car, a bus, and a truck and, more specifically, may be classified according to, for example, a maker, a model, and a year.

As described above, the vehicle distance measurement system according to an embodiment of the present invention has an advantage of being able to obtain more accurate data by specifically classifying the leading vehicle according to, for example, a type, a maker and a model of the vehicle and measuring the distance between the own vehicle and the leading vehicle.

Figure 7:
FIG. 7 is a diagram illustrating a vehicle classification result according to an embodiment of the present invention.

FIG. 7 is a diagram illustrating a vehicle classification result according to an embodiment of the present invention.

As illustrated in FIG. 7, the image of surroundings received through the camera may be analyzed to extract a light source of a specific vehicle, and a light source matching the extracted light source may be extracted through pairing. In this case, the pairing is used to determine associated light sources to be a pair in consideration of a position, brightness, a size, a color or the like of the first extracted light source and extract the taillights of the specific vehicle. Also, a type of specific vehicle may be identified in consideration of a height of the taillight, a distance between the paired taillights, positions of taillights or the like. Then, data corresponding to the identified type of specific vehicle may be extracted from the database, and an accurate position to the specific vehicle may be calculated with reference to the data. In this case, the distance to the specific vehicle may be calculated with further reference to data such as a speed and an acceleration of the own vehicle, a rotational angular velocity of the own vehicle, a speed of the specific vehicle, or the like.

Therefore, the vehicle distance measurement system according to an embodiment of the present invention has an advantage of being able to accurately measure the distance to the leading vehicle without other tasks such as data input, by analyzing a feature of a specific light source from the image of surroundings received through the camera.

While the present invention has been described above with reference to the specific matters such as the concrete components, the limited embodiments, and the drawings, these are only provided to assist in fully understanding the present invention. The present invention is not limited to the above embodiments and various modifications and variations may be made based on such a description by those skilled in the art that the present invention belongs to.

Therefore, the spirit and scope of the present invention should not be limited to the descripted embodiments and all of

DESCRIPTION OF REFERENCE NUMERALS

110: Image reception unit
120: Database unit
130: Control unit
140: Distance measurement unit
150: Output unit

What is claimed is:

1. A vehicle distance measurement system, comprising:
an image reception unit that receives an image of surroundings including an image of a specific vehicle;
a database unit that stores light source information indicating positions of vehicle taillights corresponding to a first light source and a second light source, and vehicle model data corresponding to the light source information;
a control unit that extracts the first and the second light source of the specific vehicle from the image received through the image reception unit, extracts the light source information corresponding to the first light source and the second light source from the database, and extracts the vehicle model data corresponding to the extracted light source information to recognize a type of the specific vehicle; and
a distance measurement unit that measures a distance to the specific vehicle based on the type of the specific vehicle recognized through the control unit wherein:
the vehicle model data includes tread information indicating a position in which a tire of the specific vehicle comes in contact with a road surface, and
the distance measurement unit extracts the position of the specific vehicle based on the tread information and measures the distance to the specific vehicle based on the extracted position of the specific vehicle.

2. The vehicle distance measurement system according to claim 1, wherein the light source information is information indicating a position of a taillight of a vehicle according to a vehicle type including at least one of a car, a bus, and a truck.

3. The vehicle distance measurement system according to claim 1, wherein the tread information is information that is predetermined by a pattern classifier that classifies a type of vehicle based on a pattern of a tire tread of the vehicle.

4. The vehicle distance measurement system according to claim 1, wherein the distance measurement unit measures the distance to the specific vehicle using the position of the specific vehicle, and positions of vanishing points of the first light source and the second light source.

5. The vehicle distance measurement system according to claim 1, further comprising an output unit that outputs a warning message through a screen or a speaker when the distance to the specific vehicle measured by the distance measurement unit is equal to or less than a predetermined threshold.

6. A vehicle distance measurement method, comprising:
receiving an image of surroundings including an image of a specific vehicle;
extracting a first light source and a second light source from the received image;
extracting light source information indicating positions of vehicle taillights corresponding to the first and second extracted light sources;
extracting vehicle model data corresponding to the extracted light source information to recognize a type of the specific vehicle; and
measuring a distance to the specific vehicle based on the recognized type of the specific vehicle, wherein:
the vehicle model data includes tread information indicating a position in which a tire of the specific vehicle comes in contact with a road surface, and
the measuring of a distance to the specific vehicle further includes extracting the position of the specific vehicle based on the tread information; and
measuring the distance to the specific vehicle based on the extracted position of the specific vehicle.

7. The vehicle distance measurement method according to claim 6, wherein the light source information is information indicating a position of a taillight of a vehicle according to a vehicle type including at least one of a car, a bus, and a truck.

8. The vehicle distance measurement method according to claim 6, wherein the tread information is information that is predetermined by a pattern classifier that classifies a type of vehicle based on a pattern of a tire tread of the vehicle.

9. The vehicle distance measurement method according to claim 6, wherein the measuring of a distance to the specific vehicle includes measuring the distance to the specific vehicle using the position of the specific vehicle and positions of vanishing points of the first light source and the second light source.

10. The vehicle distance measurement method according to claim 6, further comprising: outputting a warning message through a screen or a speaker when the measured distance to the specific vehicle is equal to or less than a predetermined threshold.

* * * * *